United States Patent (10) Patent No.: US 12,004,005 B2
Kim et al. (45) Date of Patent: *Jun. 4, 2024

(54) METHOD AND DEVICE FOR TRANSMITTING ACKNOWLEDGEMENT INFORMATION BY USER EQUIPMENT IN WIRELESS COMMUNICATION SYSTEM

(71) Applicant: LG Electronics Inc., Seoul (KR)

(72) Inventors: Seonwook Kim, Seoul (KR); Suckchel Yang, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/971,110

(22) Filed: Oct. 21, 2022

(65) Prior Publication Data

US 2023/0064746 A1 Mar. 2, 2023

Related U.S. Application Data

(63) Continuation of application No. 16/999,466, filed on Aug. 21, 2020, now Pat. No. 11,523,302, which is a
(Continued)

(51) Int. Cl.
*H04W 28/04* (2009.01)
*H04L 1/1607* (2023.01)
(Continued)

(52) U.S. Cl.
CPC ........... *H04W 28/04* (2013.01); *H04L 1/1614* (2013.01); *H04L 1/1812* (2013.01); *H04W 72/1273* (2013.01); *H04W 72/23* (2023.01)

(58) Field of Classification Search
CPC ....... H04L 1/16; H04L 1/1614; H04L 1/1812; H04L 1/1861; H04W 72/1273; H04W 72/23; H04W 28/04
See application file for complete search history.

(56) References Cited

U.S. PATENT DOCUMENTS

2012/0002657 A1 1/2012 Seyama et al.
2016/0226643 A1 8/2016 Mallik et al.
(Continued)

FOREIGN PATENT DOCUMENTS

CN 101615986 12/2009
CN 104301077 1/2015
(Continued)

OTHER PUBLICATIONS

CN Office Action in Chinese Appln. No. 201880002946.8, dated Nov. 30, 2020, 15 pages (with English translation).
(Continued)

*Primary Examiner* — Gary Mui
(74) *Attorney, Agent, or Firm* — Fish & Richardson P.C.

(57) ABSTRACT

A method for transmitting acknowledgement information by a user equipment (UE) in a wireless communication system, and an apparatus for supporting the same are disclosed. More particularly, a method for allowing a user equipment (UE) to transmit acknowledgement information for each code block group (CBG) with respect to data received within one or more slots is disclosed.

19 Claims, 12 Drawing Sheets

Related U.S. Application Data continuation of application No. 16/065,755, filed as application No. PCT/KR2018/003433 on Mar. 23, 2018, now Pat. No. 10,834,631.

(60) Provisional application No. 62/556,495, filed on Sep. 10, 2017, provisional application No. 62/475,837, filed on Mar. 23, 2017.

(51) Int. Cl.
*H04L 1/1812* (2023.01)
*H04W 72/1273* (2023.01)
*H04W 72/23* (2023.01)

(56) References Cited

U.S. PATENT DOCUMENTS

| | | | |
|---|---|---|---|
| 2017/0126378 A1 | 5/2017 | Luo et al. | |
| 2017/0367058 A1* | 12/2017 | Pelletier | H04W 56/0045 |
| 2018/0145703 A1 | 5/2018 | Li et al. | |
| 2018/0167931 A1 | 6/2018 | Papasakellariou | |
| 2018/0167932 A1 | 6/2018 | Papasakellariou | |
| 2018/0234881 A1 | 8/2018 | Hosseini et al. | |
| 2018/0269898 A1 | 9/2018 | Sun et al. | |
| 2018/0270022 A1 | 9/2018 | Sun et al. | |
| 2018/0270023 A1 | 9/2018 | Jiang et al. | |
| 2019/0181986 A1 | 6/2019 | Kitamura et al. | |
| 2019/0199477 A1 | 6/2019 | Park et al. | |
| 2019/0207734 A1 | 7/2019 | Yang et al. | |
| 2019/0253204 A1 | 8/2019 | Takeda et al. | |
| 2019/0261335 A1 | 8/2019 | Peng et al. | |
| 2019/0334664 A1 | 10/2019 | Guan et al. | |
| 2019/0335536 A1 | 10/2019 | Kwon et al. | |
| 2019/0363833 A1 | 11/2019 | Wang et al. | |
| 2019/0379489 A1 | 12/2019 | Hwang et al. | |
| 2020/0374043 A1 | 11/2020 | Lei | |
| 2021/0119738 A1 | 4/2021 | Yeo et al. | |
| 2021/0211232 A1 | 7/2021 | Hwang et al. | |

FOREIGN PATENT DOCUMENTS

| | | |
|---|---|---|
| CN | 105515719 | 4/2016 |
| JP | 2010147755 | 7/2010 |
| KR | 1020140078694 | 6/2014 |
| WO | WO2010109521 | 9/2012 |
| WO | WO2016021957 | 2/2016 |

OTHER PUBLICATIONS

Extended European Search Report in European Application No. 18771008.2, dated Jan. 17, 2020, 11 pages.
Japanese Office Action in Japanese Application No. 2019-531083, dated Aug. 4, 2020, 6 pages (with English translation).
LG Electronics, "Discussion on scheduling and HARQ feedback for NR," R1-1702486, 3GPP TSG RAN WG1 Meeting #88, Athens, Greece, dated Feb. 13-17, 2017, 8 pages.
MediaTek Inc., "On multiple HARQ bits per TB and feedback mechanism," 3GPP TSG RAN WG1 Meeting #88, dated Feb. 13-17, 2017, 5 pages.
Nokia et al., "Multi-bit feedback for NR HARQ operation," 3GPP TSG-RAN WG1 Meeting #88, dated Feb. 13-17, 2017, 6 pages.
NTT Docomo, Inc., "Views on HARQ enhancements for NR," R1-1702815, 3GPP TSG RAN WG1 Meeting #88, Athens, Greece, dated Feb. 13-17, 2017, 4 pages.
Potevio, "Discussion on partial retransmission for eMBB," R1-1703232, 3GPP TSG RAN WG1 Meeting #88, Athens, Greece, Feb. 13-17, 2017, 4 pages.
Samsung, "CB-group based retransmission for eMBB," 3GPP TSG RAN WG1 Meeting #88, dated Feb. 13-17, 2017, 10 pages.
Samsung, "TB/CB Handling for eMBB," 3GPP TSG RAN WG1 NR Ad-Hoc Meeting, dated Jan. 16-20, 2017, 6 pages.
Samsung, "HARQ-ACK Feedback for Numerology Multiplexing," R1-1702989, 3GPP TSG RAN WG1 #88, Athens, Greece, dated Feb. 13-17, 2017, 5 pages, XP051210131.
Samsung, "Offline discussions on CBG-based retransmission for AI 6.1.3.3.4," R1-1715223, 3GPP TSG RAN WG1 Meeting #90, Prague, Czechia, dated Aug. 21-25, 2017, 8 pages.
ZTE, "NR HARQ timing and feedback schemes," 3GPP TSG RAN WG1 Meeting #88, dated Feb. 13-17, 2017, 9 pages.

* cited by examiner

METHOD AND DEVICE FOR TRANSMITTING ACKNOWLEDGEMENT INFORMATION BY USER EQUIPMENT IN WIRELESS COMMUNICATION SYSTEM

CROSS-REFERENCE TO RELATED APPLICATIONS

This application is a continuation of U.S. application Ser. No. 16/999,466, filed on Aug. 21, 2020, which is a continuation of U.S. application Ser. No. 16/065,755, filed on Dec. 20, 2018, now U.S. Pat. No. 10,834,631, which is a National Stage application under 35 U.S.C. § 371 of International Application No. PCT/KR2018/003433, filed on Mar. 23, 2018, which claims the benefit of U.S. Provisional Application No. 62/556,495, filed on Sep. 10, 2017, and U.S. Provisional Application No. 62/475,837, filed on Mar. 23, 2017. The disclosures of the prior applications are incorporated by reference in their entirety.

TECHNICAL FIELD

The following description relates to a wireless communication system, and more particularly to a method for transmitting acknowledgement information by a user equipment (UE) in a wireless communication system, and an apparatus for supporting the same.

Specifically, the following description relates to a method for allowing a user equipment (UE) to transmit acknowledgement information for each code block group (CBG) with respect to data received within one or more slots.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

SUMMARY

An object of the present disclosure devised to solve the problem lies in a method for transmitting acknowledgement information by a user equipment (UE) in a wireless communication system, and an apparatus for supporting the same.

In particular, it is an object of the present disclosure to provide a method for allowing a user equipment (UE) to transmit acknowledgement information for each code block group (CBG) with respect to data received within one or more slots.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method for transmitting acknowledgement information by a user equipment (UE) in a wireless communication, and an apparatus for supporting the same.

In accordance with one aspect of the present disclosure, a method for transmitting acknowledgement information of a user equipment (UE) in a wireless communication system includes: receiving data in one or more slots; and generating CBG (Code Block Group) level acknowledgement information contained in data received at the one or more slots, as acknowledgement information to be transmitted at a first slot, and transmitting the generated acknowledgement information at the first slot.

In accordance with another aspect of the present disclosure, a user equipment (UE) for transmitting acknowledgement information to a base station (BS) in a wireless communication system includes a transmitter, a receiver, and a processor configured to operate by connecting to the transmitter and the receiver. The processor receives data in one or more slots, and generates CBG (Code Block Group) level acknowledgement information contained in data received at the one or more slots, as acknowledgement information to be transmitted at a first slot, and transmits the generated acknowledgement information at the first slot.

The acknowledgement information is configured to have any one of a first bit size (1), a second bit size (2), a third bit size (3), and a fourth bit size (4). In this case, each of N, M, K, X, and Y is a natural number.

(1) The first bit size—the first bit size is determined on the basis of not only a maximum number N of slots interacting with a transmission (Tx) time point of the acknowledgement information at the first slot, but also a maximum number M of code block groups (CBGs) for only one slot.

(2) The second bit size—the second bit size is determined on the basis of not only the number K of slots established in the acknowledgement information at the first slot, but also a maximum number M of CBGs for only one slot.

(3) The third bit size—the third bit size is determined on the basis of a total number X of CBGs transmitted at the one or more slots.

(4) The fourth bit size—the fourth bit size is determined on the basis of not only the number K of slots established in the acknowledgement information at the first slot, but also a maximum number Y of CBGs transmitted at one slot from among the one or more slots.

The first bit size may be a size of (N×M) bits.

The acknowledgement information having the (N×M)-bit size may include bit information about M CBGs for each of the N slots. If data is not scheduled or is not received at a specific slot from among the N slots, all M-bit information of a slot about the specific slot is set to non-acknowledgement (NACK). If the number of received CBGs is less than M whereas data is received at the specific slot from among the N slots, all bit information having no corresponding CBGs from among the M-bit information about the specific slot is set to NACK.

For example, the N value may be set to 4.

The K value may be less than the N value.

The second bit size may be a size of (K×M) bits.

The acknowledgement information having the (K×M)-bit size may include bit information about M CBGs for each of the K slots. If data is not scheduled or is not received at a specific slot from among the K slots on the basis of a downlink assignment index (DAI) value received at the one or more slots, all M-bit information of a slot about the specific slot is set to non-acknowledgement (NACK). If the number of received CBGs is less than M whereas data is received at the specific slot from among the K slots, all bit information having no corresponding CBGs from among the M-bit information about the specific slot is set to NACK.

In this case, each DAI received at the one or more slots may indicate the number of scheduled slots about the acknowledgement information at the first slot until reaching a corresponding slot in a time domain.

The M value may be UE-specifically established or may be group-commonly established, wherein the group includes the UE.

The third bit size may be a size of X bits.

The X value may be determined based on a total downlink assignment index (T-DAI) value received at the one or more slots. Bit information in which a corresponding CBG from among the acknowledgement information composed of the X bits is not received may be set to non-acknowledgement (NACK) on the basis of each counter DAI (C-DAI) value received at the one or more slots.

The fourth bit size may be a size of (K×Y) bits.

Bit information in which a corresponding CBG from among the acknowledgement information composed of the (K×Y) bits is not present, may be set to non-acknowledgement (NACK) on the basis of a downlink assignment index (DAI) value received at a final slot from among the one or more slots.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to the present disclosure, the UE may generate acknowledgement information for each CBG contained in data received within one or more slots according to various embodiments, and may transmit the generated acknowledgement information.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

BRIEF DESCRIPTION OF THE DRAWINGS

The accompanying drawings, which are included to provide a further understanding of the invention, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

DETAILED DESCRIPTION

Figure 1:
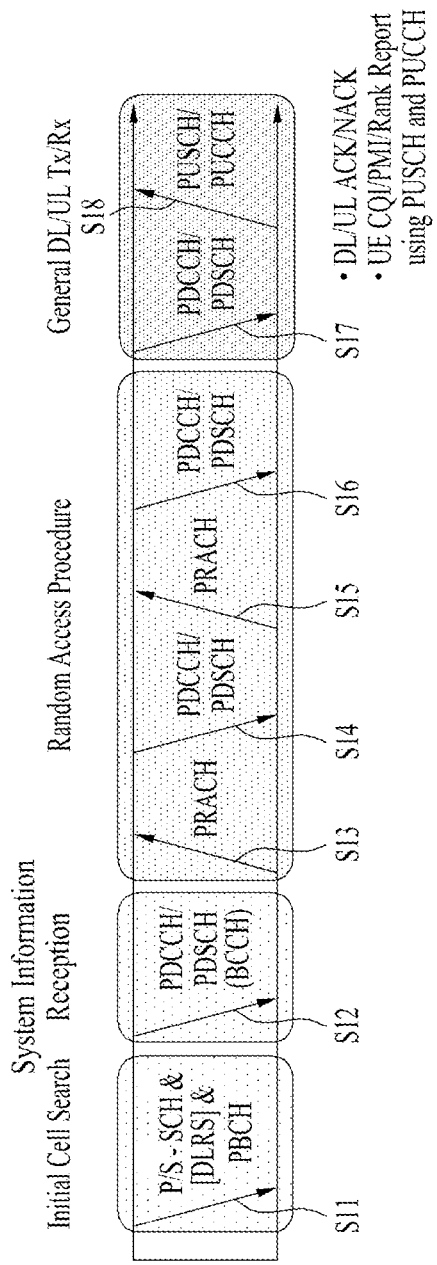
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2A:
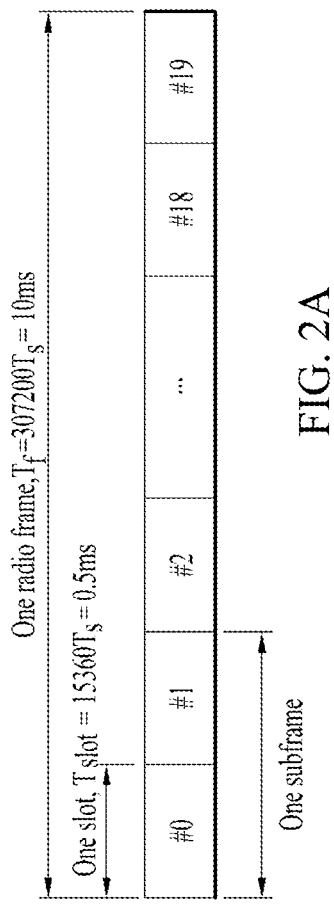
FIGS. 2A and 2B are diagrams illustrating exemplary radio frame structures.
Figure 2B:
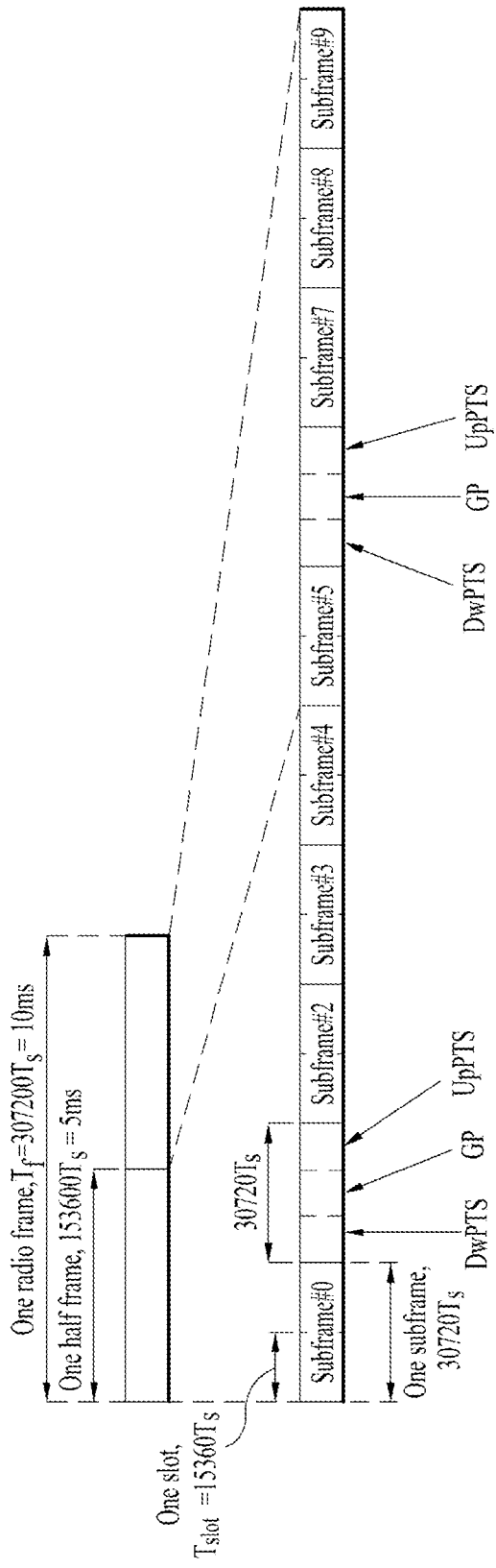

FIGS. 2A and 2B illustrate exemplary radio frame structures used in embodiments of the present disclosure.

FIG. 2A illustrates frame structure type 1. Frame structure type 1 is applicable to both a full Frequency Division Duplex (FDD) system and a half FDD system.

One radio frame is 10 ms ($Tf=307200 \cdot Ts$) long, including equal-sized 20 slots indexed from 0 to 19. Each slot is 0.5 ms ($Tslot=15360 \cdot Ts$) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $Ts=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2B illustrates frame structure type 2. Frame structure type 2 is applied to a Time Division Duplex (TDD) system. One radio frame is 10 ms ($Tf=307200 \cdot Ts$) long, including two half-frames each having a length of 5 ms ($=153600 \cdot Ts$) long. Each half-frame includes five subframes each being 1 ms ($=30720 \cdot Ts$) long. An ith subframe includes 2ith and (2i+1)th slots each having a length of 0.5 ms ($Tslot=15360 \cdot Ts$). Ts is a sampling time given as $Ts=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink)

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $(1 + X) \cdot$ | $(1 + X) \cdot$ | $7680 \cdot T_s$ | $(1 + X) \cdot$ | $(1 + X) \cdot$ |
| 1 | $19760 \cdot T_s$ | $2192 \cdot T_s$ | $2560 \cdot T_s$ | $20480 \cdot T_s$ | $2192 \cdot T_s$ | $2560 \cdot T_s$ |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot$ | $(2 + X) \cdot$ |
| 5 | $6592 \cdot T_s$ | $(2 + X) \cdot$ | $(2 + X) \cdot$ | $20480 \cdot T_s$ | $2192 \cdot T_s$ | $2560 \cdot T_s$ |
| 6 | $19760 \cdot T_s$ | $2192 \cdot T_s$ | $2560 \cdot T_s$ | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
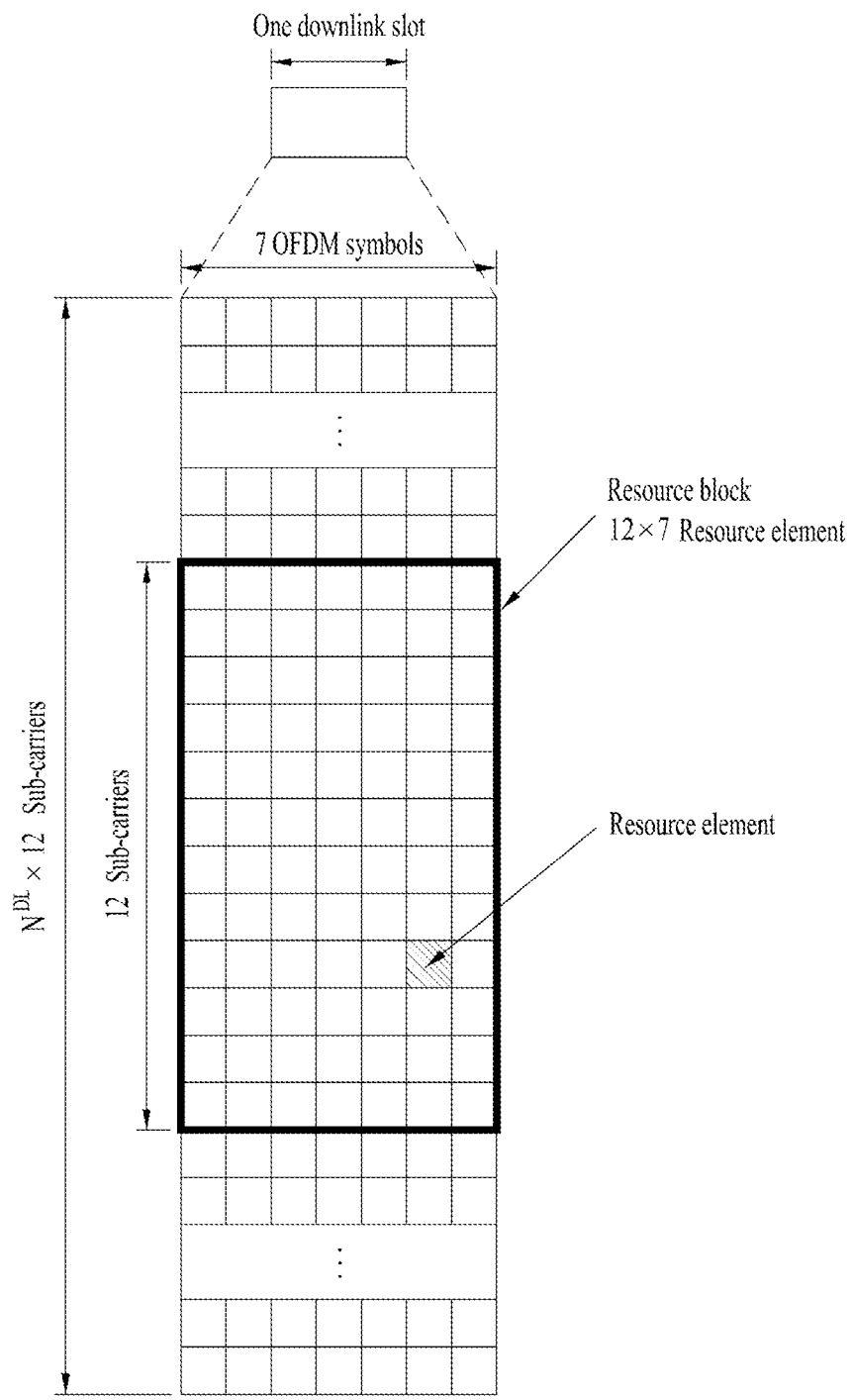
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
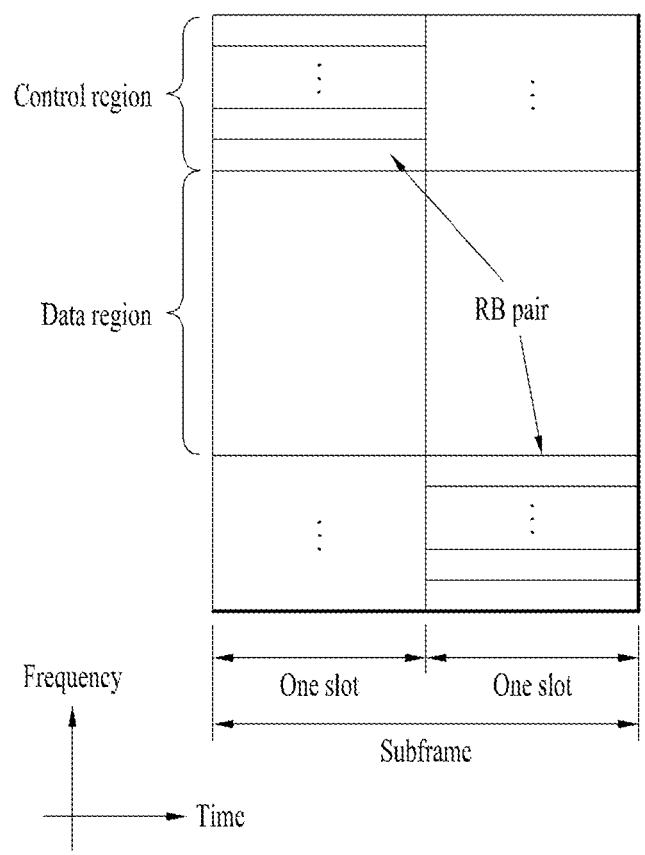
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
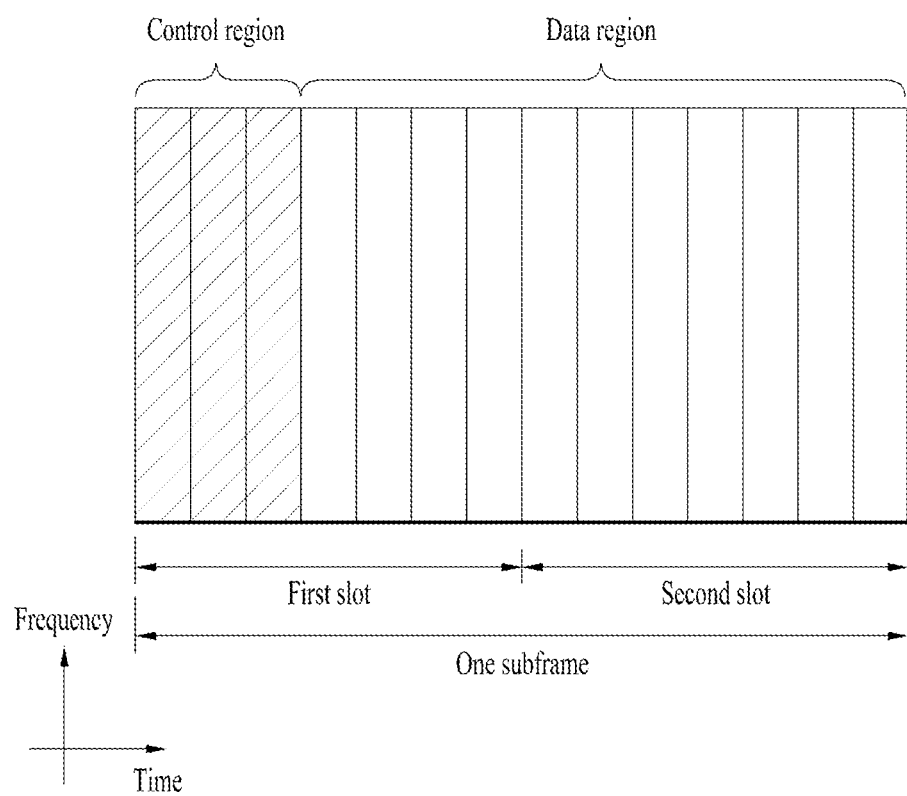
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present disclosure, the corresponding technology is referred to as the new RAT or new radio (NR) for convenience of description.

2.1. Numerologies

The NR system to which the present disclosure is applicable supports various OFDM numerologies shown in the following table. In this case, the value of $\mu$ and cyclic prefix information per carrier bandwidth part can be signaled in DL and UL, respectively. For example, the value of $\mu$ and cyclic prefix information per downlink carrier bandwidth part may be signaled though DL-BWP-mu and DL-MWP-cp corresponding to higher layer signaling. As another example, the value of $\mu$ and cyclic prefix information per uplink carrier bandwidth part may be signaled though UL-BWP-mu and UL-MWP-cp corresponding to higher layer signaling.

TABLE 3

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu} -1\}$ and may also be numbered within a frame in ascending order like $n_{s,f}^\mu \in \{0, \ldots, N_{slot}^{frame,\mu} -1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present disclosure can be applied, a self-contained slot structure can be applied based on the above-described slot structure.

Figure 6:
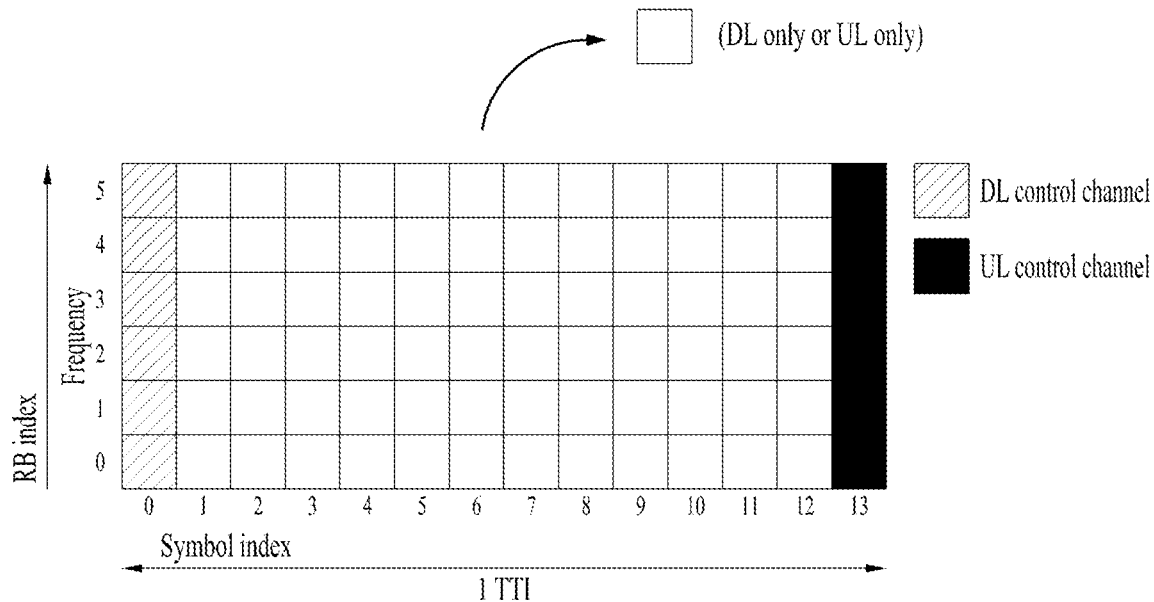
FIG. 6 is a diagram illustrating a self-contained subframe structure applicable to the present disclosure.

FIG. 6 is a diagram illustrating a self-contained slot structure applicable to the present disclosure.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present disclosure may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
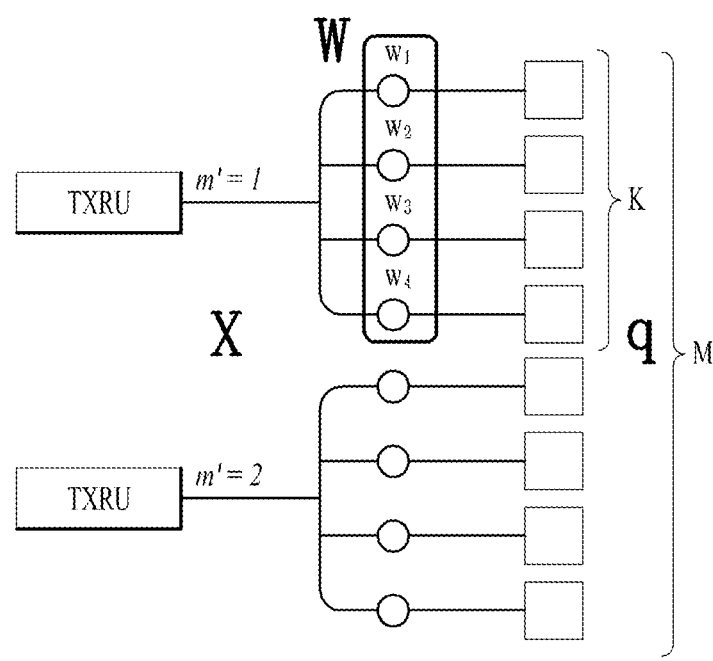
FIGS. 7 and 8 are diagrams illustrating representative connection methods for connecting TXRUs to antenna elements.
Figure 8:
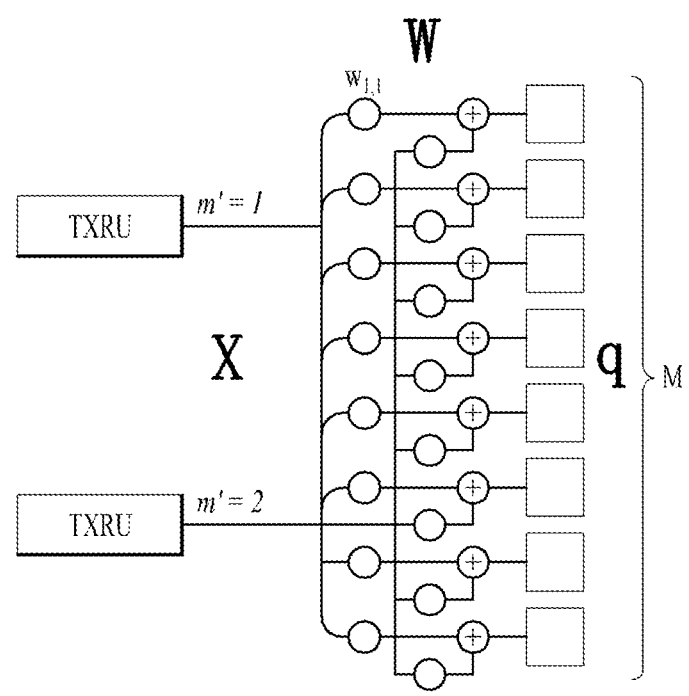

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present disclosure is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
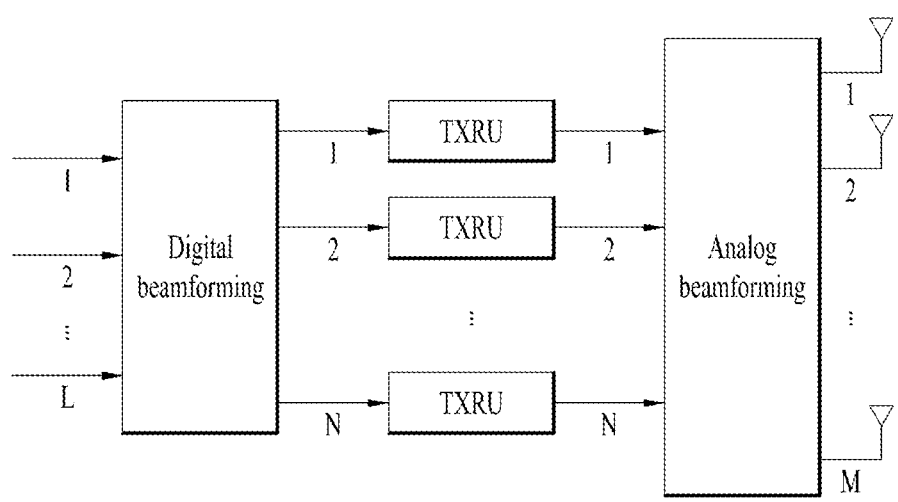
FIG. 9 is a schematic diagram illustrating a hybrid beamforming structure according to an embodiment of the present disclosure from the perspective of TXRUs and physical antennas.

FIG. 9 is a schematic diagram illustrating a hybrid beamforming structure according to an embodiment of the present disclosure from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present disclosure is applicable. Further, a method of introducing a plurality of antenna panels where independent hybrid beamforming can be applied by defining N TXRUs and M RF antennas as one antenna panel has also been considered in the NR system to which the present disclosure is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present disclosure is applicable.

Figure 10:
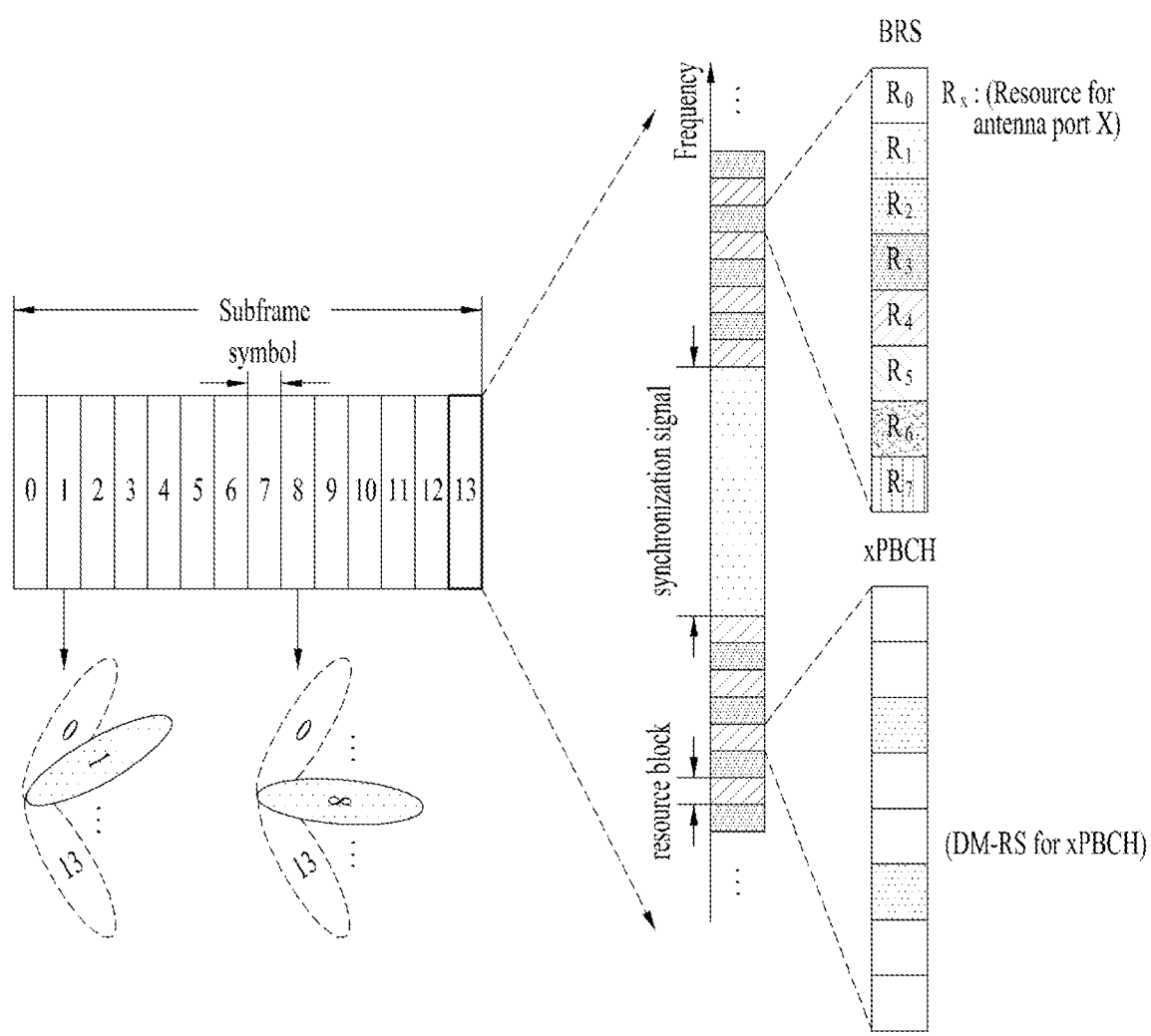
FIG. 10 is a diagram schematically illustrating the beam sweeping operation for synchronization signals and system information during a downlink (DL) transmission process according to an embodiment of the present disclosure.

FIG. 10 is a diagram schematically illustrating the beam sweeping operation for synchronization signals and system information during a downlink (DL) transmission process according to an embodiment of the present disclosure.

In FIG. 10, a physical resource (or channel) for transmitting system information of the NR system to which the present disclosure is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present disclosure is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

3. Proposed Embodiment

The following description will disclose a structure proposed by the present disclosure based on the above-mentioned technical idea.

In the legacy LTE system, if DL data (i.e., TB (Transmission Block) size) is larger in size than a predetermined level or higher, a bit stream to be transmitted over a PDSCH may be divided into a plurality of codeword blocks (CBs), channel coding is performed per CB, and a cyclic redundancy check (CRC) is applied to each CB, such that the resultant bit stream can be transmitted over a PDSCH.

In this case, when the UE fails to decode any one of the plurality of CBs contained in one PDSCH, the UE may report a HARQ-ACK feedback corresponding to the PDSCH to an eNB (or gNB) through NACK. As a result, the eNB (or gNB) may retransmit all CBs, which have been reported through NACK, to the UE.

In other words, the HARQ operation for DL data for use in the legacy LTE system may be carried out not only according to scheduling/transmission information based on a TB received from the eNB (or gNB), but also according to a HARQ-ACK feedback structure based on a TB received from the UE.

In contrast, the NR system applicable to the present disclosure may basically have a wider system carrier bandwidth than the LTE system. As a result, there is a higher possibility that a (maximum) TB size is larger than a TB size supported by the legacy LTE system. Therefore, the number of CBs contained in one TB may also be higher than the number of CBs contained in one TB supported by the legacy LTE system.

Accordingly, when the above-mentioned system performs the TB-based HARQ-ACK feedback in the same manner as in the conventional LTE system, and even when a decoding error (i.e., NACK) occurs only in a small number of CBs, TB-based retransmission scheduling is needed, resulting in reduction in resource use efficiency.

The NR system applicable to the present disclosure may support data transmission in a manner that a second data type (e.g., Ultra Reliable Low Latency Communication (URLLC)) that is sensitive to delay having a short time interval (e.g., a short Transmission Time Interval (TTI)) can puncture a first data type through some (e.g., symbols) of resources allocated to transmission of the first data type (e.g., enhanced Mobile BroadBand (eMBB)) that is not sensitive to delay having a long time interval (e.g., a long TTI). Due to influence of an interference signal having time-selective characteristics associated with the above-mentioned cases, decoding errors may be concentrated only on some specific CBs from among the plurality of CBs contained in one TB with respect to the first data type.

Considering operational characteristics of the above-mentioned NR system, the present disclosure may provide a method for performing (retransmission) scheduling in units of CB or CBG (Code Block Group) and constructing/transmitting the HARQ-ACK feedback in units of CB and/or CBG.

In this case, a HARQ-ACK transmission (Tx) time point corresponding to one DL datum may be determined to be a single value from among prescribed sets, and the single value may be dynamically designated through downlink control information (DCI) including DL assignment. In this case, HARQ-ACK information transmitted within a specific slot may correspond to DL data transmitted through several slots.

Figure 11:
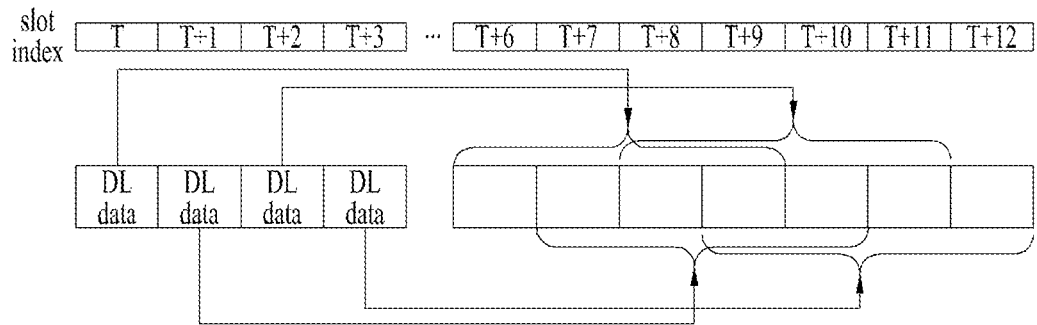
FIG. 11 is a conceptual diagram illustrating a HARQ ACK transmission method applicable to the present disclosure.

FIG. 11 is a conceptual diagram illustrating a HARQ ACK transmission method applicable to the present disclosure.

Referring to FIG. 11, four candidate HARQ time points about DL data transmitted in the respective slots may be pre-configured by higher layer signaling, and a single HARQ time point from among the four candidate HARQ time points may be indicated as the HARQ-ACK Tx time point through dynamic indication.

For example, four candidate HARQ time points (e.g., slot #T+6, slot #T+7, slot #T+8, and slot #T+9) may be configured in response to DL data transmitted in the slot slot #T through higher layer signaling, and one of the four candidate HARQ time points may be indicated through dynamic indication.

Therefore, HARQ-ACK information corresponding to several DL data segments may be simultaneously transmitted through only one slot. For example, in the slot slot #T+9, HARQ-ACK information corresponding to DL data transmitted in at least one of the slots slot #T, slot #T+1, slot #T+2, and slot #T+3 may be transmitted. A method for transmitting HARQ-ACK information of a user equipment (UE) under the above-mentioned cases will hereinafter be described in detail.

Figure 12:
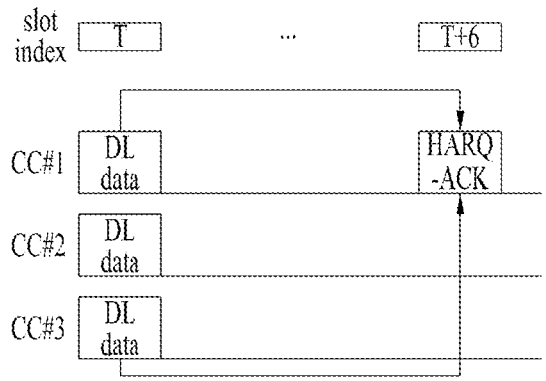
FIG. 12 is a conceptual diagram illustrating a method for transmitting HARQ-ACK information corresponding to DL data transmitted from a plurality of component carriers (CCs) in a carrier aggregation (CA) environment.

FIG. 12 is a conceptual diagram illustrating a method for transmitting HARQ-ACK information corresponding to DL data transmitted from a plurality of component carriers (CCs) in a carrier aggregation (CA) environment.

Referring to FIG. 12, HARQ-ACK information on several CCs may be transmitted at a specific slot of a single specific CC even in the CA environment. A method for transmitting HARQ-ACK information of a user equipment (UE) under the above-mentioned cases will hereinafter be described in detail.

In addition, a MIMO (Multiple Input Multiple Output) system can simultaneously transmit two or more TBs. CBG-based HARQ operations of the UE for use in the above-mentioned case will hereinafter be described.

According to the present disclosure, all CBs (contained in one TB) may be configured as one CBG, some CBs (contained in one TB) may be configured as one CBG, or each CB may be configured as one CBG.

3.1. Dynamic HARQ Timing Indication or CBG-Based HARQ-ACK Transmission Method in the CA Environment 3.1.1. 1-1 HARQ ACK Transmission Method If DL data TB scheduled to N slots is linked to the same single HARQ-ACK time point, the (maximum) number of CBG sets (or aggregates) constructing the DL data TB scheduled to the plurality of slots or the (maximum) number of CBGs constructing the DL data TB scheduled to the plurality of slots may be configured (or limited) to be identical to each other.

Assuming that the (maximum) number of CBGs is set to M, the UE may construct a HARQ-ACK payload (that is configured as, for example, (N×M)-bit information when DL data transmission of each slot is transmission of 1 TB) about a total of (N×M) CBGs, and may then transmit the constructed HARQ-ACK payload. In this case, M may be differentially (or UE-group commonly) allocated to individual UEs, may be configured according to the designated PUCCH resource or PUCCH format, or may be configured as a maximum number of CBGs from among CBG numbers capable of being scheduled to the respective N slots. Alternatively, the value of M may be equally configured in bundling windows corresponding to either the same HARQ-ACK time point or the corresponding time point, or the same or different M values may be configured between bundling windows corresponding to either different HARQ-ACK time points or the corresponding time points. For convenience of description, if N slots are linked to the same one HARQ-ACK time point, the N slots may be defined as a bundling window.

That is, as described above, the HARQ-ACK transmission time corresponding to one DL datum may be set to a single value from among the prescribed sets, the single value may be dynamically indicated through DCI having DL assignment information, and HARQ-ACK information transmitted in a specific slot may correspond to DL data transmitted through several slots. As shown in the example of FIG. 11, four candidate HARQ time points (e.g., slot #T+6, slot #T+7, slot #T+8, and slot #T+9) may be configured by higher layer signaling in response to DL data transmitted in the slot slot #T, and one of the four candidate HARQ time points may be indicated through dynamic indication. Therefore, HARQ-ACK information corresponding to several data segments may be transmitted through one slot, and HARQ-ACK information corresponding to DL data transmitted in at least one of the plurality of slots slot #T, slot #T+1, slot #T+2, and slot #T+3 at the slot slot #T+9. In this case, N may be set to 4.

Here, HARQ-ACK payload for M CBGs may be configured per slot. In this case, it may be possible to establish the rule in which A/N information about the remaining (M−L) CBGs is processed or mapped when L CBGs of less than M CBGs are constructed or scheduled. In addition, only some slots (e.g., P slots) from among N slots may be scheduled (or DL data may be received). In this case, it may also be possible to establish the rule in which A/N information about CBG(s) corresponding to the remaining (N-P) slots is processed or mapped as NACK.

Figure 13:
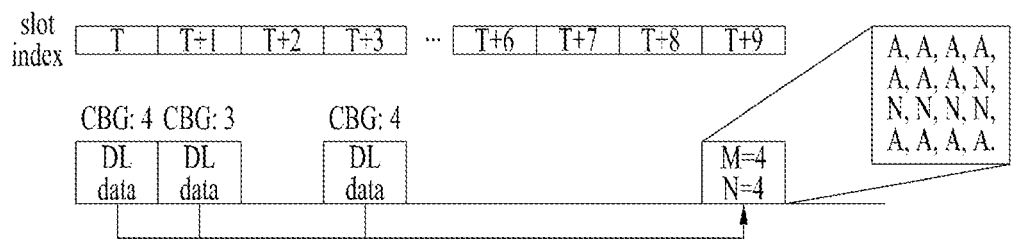
FIG. 13 is a conceptual diagram illustrating operations based on the 1-1 HARQ ACK transmission method according to an embodiment of the present disclosure.

FIG. 13 is a conceptual diagram illustrating operations based on the 1-1 HARQ ACK transmission method according to an embodiment of the present disclosure.

Referring to FIG. 13, if the (maximum) number N of slots corresponding to HARQ-ACK information transmitted to the slot slot #T+9 is set to 4 (i.e., slot #7 to slot #T+3) and the (maximum) number M of CBGs is set to 4, HARQ-ACK information composed of 16-bit payload may be transmitted at the slot slot #T+9. In this case, assuming that information transmission for each of all CBGs was successful, HARQ-ACK information corresponding to the last CBG of the slot slot #T+1 and all CBGs of the slot slot #T+2 may be constructed as NACK.

Meanwhile, HARQ-ACK payload about a total of (N×M) CBGs may be transmitted through a single PUCCH resource. Alternatively, HARQ-ACK payload about M CBGs for each slot may be transmitted through individual PUCCH resources of the respective slots.

3.1.2. 1-2 HARQ ACK Transmission Method (Under the condition that the 1-1 HARQ ACK transmission method is used) DL data scheduling may be limited to be applied only to a maximum of K slots (where K<N) from among N slots linked to one HARQ-ACK time point.

Provided that the number of configured CBGs according to the 1-1 HARQ ACK transmission method is defined as M, HARQ-ACK payload (for example, (K×M) CBGs in case of 1 TB transmission per slot) about a total of (K×M) CBGs may be constructed and transmitted. In this case, K may be differentially (or UE-group commonly) configured according to individual UEs, or may be configured according to PUCCH resources or PUCCH formats prescribed on HARQ-ACK timing.

The above-mentioned method can greatly reduce HARQ-ACK payload to which scheduling restriction is applied, as compared to the above-mentioned 1-1 HARQ-ACK transmission method.

In this case, in order to solve misalignment between the HARQ-ACK payload and mapping methods between the UE and the eNB (or gNB) when the UE does not receive DCI used for DL data scheduling, it may be possible to signal the number of slots scheduled up to now within the bundling window for each DL assignment, the number of TBs (similar to a counter DAI of the legacy LTE system) scheduled up to now within the bundling window for each DL assignment, or the (maximum) number of CBGs scheduled up to now within the bundling window for each DL assignment.

In this case, HARQ-ACK payload about M CBGs may be constructed per slot. In this case, it may be possible to establish the rule in which A/N information about the remaining (M-L) CBGs is processed or mapped as NACK when L CBGs of less than M CBGs are constructed or scheduled. In addition, only some slots (e.g., P slots) from among N slots may be scheduled (or DL data may be received). In this case, it may also be possible to establish the rule in which A/N information about CBG(s) corresponding to the remaining (N-P) slots is processed or mapped as NACK.

Figure 14:
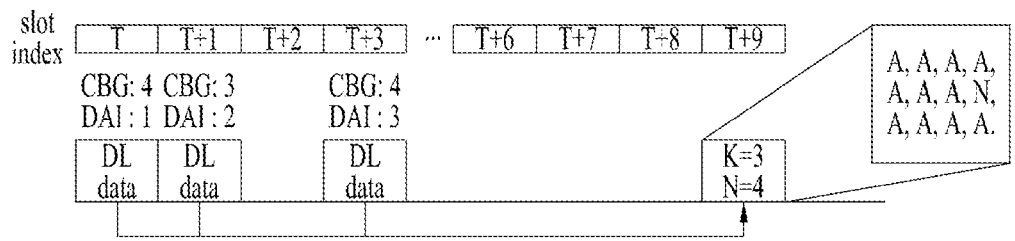
FIG. 14 is a conceptual diagram illustrating operations based on the 1-2 HARQ ACK transmission method according to an embodiment of the present disclosure.

FIG. 14 is a conceptual diagram illustrating operations based on the 1-2 HARQ ACK transmission method according to an embodiment of the present disclosure.

Referring to FIG. 14, if the (maximum) number K of slots corresponding to HARQ-ACK information transmitted at the slot slot #T+9 is limited to 3 (e.g., three slots from among the slots slot #T slot #T+3), and if the (maximum) number M of CBGs is set to 4, HARQ-ACK information composed of 12-bit payload may be transmitted at the slot slot #T+9.

In this case, assuming that information transmission for each of all CBGs was successful, HARQ-ACK information corresponding to the last CBG of the slot slot #T+1 may be processed or mapped as NACK.

Alternatively, when the UE does not receive DL assignment information for scheduling DL data transmitted at the slot slot #T+1, the UE may recognize that DL assignment information corresponding to DAI=2 has been missed by means of "DAI=3" allocated to DL assignment information for scheduling DL data transmitted to the slot slot #T+3. Therefore, the UE may allow fifth to eighth HARQ-ACK information to be processed or mapped as NACK.

In this case, the DAI value may indicate the number of slots scheduled up to now or the number of TBs scheduled up to now as shown in the above example, and may also indicate the (maximum) number of CBGs scheduled up to now (for example, 4 at slot #T, 8 at slot #T+1, or 12 at slot #T+2).

Meanwhile, HARQ-ACK feedback about a total of (K×M) CBGs may be transmitted through one PUCCH resource (Opt 1) or HARQ-ACK feedback about M CBGs for each slot may be transmitted through individual PUCCH resources (Opt 2).

In the case of Opt 1, there is a need to signal the number of slots scheduled up to now within the bundling window for each DL assignment, the number of TBs (similar to a counter DAI of the legacy LTE system) scheduled up to now within the bundling window for each DL assignment, or the (maximum) number of CBGs scheduled up to now within the bundling window for each DL assignment. However, in the case of Opt 2, it is not necessary to signal the above-mentioned signaling.

The above-mentioned method can also be applied not only to CBG-based scheduling, but also to general TB-based scheduling (for example, not only for reduction of the UCI payload size, but also for UL coverage acquisition).

3.1.3. 1-3 HARQ ACK Transmission Method (Under the condition that there is no limitation on the number of CBGs for each slot) the eNB (or BS) may signal a counter DAI (C-DAI) and a total DAI (T-DAI), each of which has a CBG level, through DCI, and the UE may construct HARQ-ACK payload (size) on the basis of the received DAI, and may transmit the constructed HARQ-ACK payload (size).

In this case, C-DAI may indicate the number of CBGs transmitted previously (or up to now) within the bundling window, T-DAI may indicate a total number of CBGs transmitted within the bundling window or a total number of CBGs to be transmitted within the bundling window. Therefore, the UE may determine the position of HARQ-ACK information corresponding to each slot on HARQ-ACK payload through the C-DAI value, and may determine the total HARQ-ACK payload size through the T-DAI value.

The above-mentioned method has advantages in that it can increase DCI overhead or can adaptively change the HARQ-ACK payload size.

Figure 15:
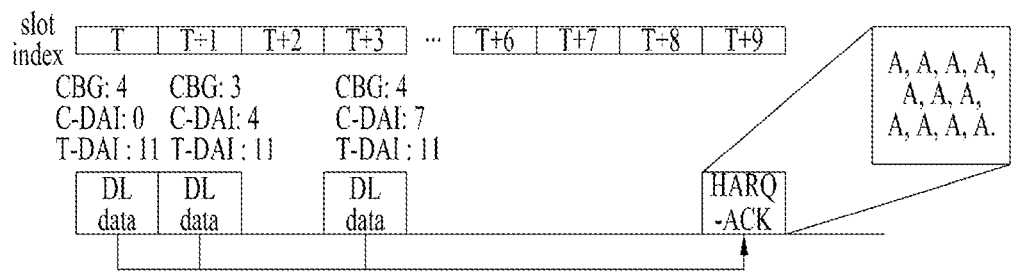
FIG. 15 is a conceptual diagram illustrating operations based on the 1-3 HARQ ACK transmission method according to an embodiment of the present disclosure.

FIG. 15 is a conceptual diagram illustrating operations based on the 1-3 HARQ ACK transmission method according to an embodiment of the present disclosure.

Referring to FIG. 15, it is assumed that the bundling window is composed of 4 slots and reception of all CBGs is successful. In this case, the UE may recognize that the total HARQ-ACK payload size is 11 bits through T-DAI information, and may also recognize the order of constructing the 11 bits through each C-DAI value.

If the UE does not receive (has missed) DL assignment information for scheduling DL data transmitted at the slot slot #T+1, the UE may recognize that DL assignment information for scheduling three intermediate CBGs through the C-DAI value, which is denoted by 7 on DL assignment information needed to schedule DL data transmitted at the slot slot #T+3, has not been received (has been missed). Thus, the UE may allow all the $5^{th}$ to $7^{th}$ HARQ-ACK information to be processed or mapped as NACK.

In this case, as shown in the above-mentioned example, the C-DAI value may indicate the number of CBGs transmitted previously within the bundling window, or may indicate the number of CBGs transmitted up to now within the bundling window (for example, C-DAI=4 at slot #T, C-DAI=7 at slot #T+1, and C-DAI=11 at slot #T+2).

3.1.4. 1-4 HARQ ACK Transmission Method (Under the condition that there is no limitation on the number of CBGs for each slot) in a state in which a maximum HARQ-ACK payload size is configured, the eNB (or BS) may always construct the HARQ-ACK feedback having the corresponding size, and may signal only the CBG-level DAI through DCI.

Whereas the above-mentioned method can fix the maximum HARQ-ACK payload size, the above-mentioned method can freely establish the CBG size for each TB.

In this case, in order to solve misalignment between the HARQ-ACK payload and mapping methods between the UE and the eNB (or gNB) when the UE has not received (has missed) DCI used for DL data scheduling, the BS may signal the (maximum) number of CBGs scheduled up to now within the bundling window for each DL assignment. In this case, the rule may be established in which AN information about the remaining CBGs is processed or mapped as NACK when CBGs smaller in number than the maximum HARQ-ACK payload size are constructed or scheduled.

Figure 16:
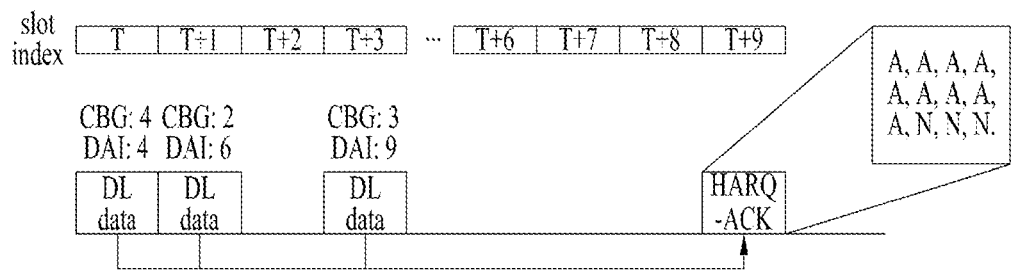
FIG. 16 is a conceptual diagram illustrating operations based on the 1-4 HARQ ACK transmission method according to an embodiment of the present disclosure.

FIG. 16 is a conceptual diagram illustrating operations based on the 1-4 HARQ ACK transmission method according to an embodiment of the present disclosure.

In FIG. 16, it is assumed that the bundling window is composed of 4 slots, the maximum HARQ-ACK payload size is set to 12 bits, and the UE has successfully received all CBGs.

In this case, the UE may recognize the order of constructing 12 bits through the respective DAI values contained in DCI. In addition, since the DAI value contained in DCI used for scheduling the last DL data contained in the bundling window is set to 9, the UE may process or map the remaining 3-bit information as NACK.

If the UE does not receive DL assignment information for scheduling DL data at the slot slot #T+1, the UE may recognize that DL assignment information for scheduling two intermediate CBGs through the DAI value, which is denoted by 9 on DL assignment information needed to schedule DL data transmitted in the slot slot #T+3, has not been received (has been missed). Thus, the UE may allow all the $5^{th}$ to $6^{th}$ HARQ-ACK information to be processed or mapped as NACK.

In this case, as shown in the above-mentioned example, the DAI value may indicate the number of CBGs transmitted up to now within the bundling window, or may indicate the number of CBGs transmitted previously within the bundling window (for example, C-DAI=0 at slot #T, C-DAI=4 at slot #T+1, and C-DAI=6 at slot #T+2).

In the aforementioned 1-1 to 1-4 HARQ ACK transmission methods, the term "slot" may be replaced with each CC in CA situation.

In the aforementioned 1-2 to 1-4 HARQ ACK transmission methods, the operation for signaling the DAI value (or C-DAI or T-DAI) to DCI may be established to indicate modulo-operation values obtained when a modulo operation of a specific value (e.g., 16) is performed in consideration of signaling overhead.

3.2. CBG-Based Scheduling and HARQ Operation Method in Transmission Situation of Multiple TBs Through MIMO 3.2.1. 2-1 Method If it is possible to signal whether DL data or UL data scheduled through DCI is TB-based (initial) transmission or CBG-based (re)transmission, the initial transmission or the retransmission may be indicated for each TB (Opt A), or may be TB-commonly indicated (Opt B).

For example, it is assumed that the BS can signal whether DL data or UL data corresponds to TB-based (initial) transmission or CBG-based (re)transmission through DCI.

In this case, according to Opt A, DCI may include as many indicators as the number of scheduled TBs. Alternatively, if a Cyclic Redundancy Check (CRC) mask for signaling whether data transmission is TB-based (initial) transmission or CBG-based (re)transmission through DCI is used, different CRC masks may be defined and applied according to a combination of information about TB-based (initial) transmission per TB or information about CBG-based (re)transmission per TB.

3.2.2. 2-2 Method

If DL data or UL data scheduled through DCI is composed of 2 TBs (or more), the same number of CBGs may be allocated to respective TBs (Alt 1), or different numbers of CBGs may be allocated to the respective TBs (Alt 2).

In case of Alt 2, or in the case where DL data corresponding to different numbers of CBGs allocated to respective TBs (or codewords CWs) is received, codeword bundling is needed when the HARQ-ACK payload size is limited.

In this case, the UE may determine a maximum value from among the CBG numbers established in the respective TBs to be the HARQ-ACK payload size. In association with TBs where a smaller number of CBGs than the determined HARQ-ACK payload size is established, the UE may allow information denoted by {(HARQ-ACK payload)−(the number of CBGs)} to be processed or mapped as ACK, or may reallocate a CBG structure about the corresponding TB in a manner that the determined HARQ-ACK payload is equally established in the respective TBs, such that codeword bundling may be applied to the resultant information.

For example, when 5 CBGs construct TB #1 and 3 CBGs construct TB #2, the UE may set the number of CBGs to 5 indicating the maximum number of CBGs during codeword bundling, such that a 5-bit HARQ-ACK payload is constructed. The first three bits may be constructed using the AND or OR operation between HARQ-ACK information of TB #1 and HARQ-ACK information of TB #2, and the last 2 bits may be constructed of only HARQ-ACK information of TB #1. Alternatively, CBGs for TB #2 are re-arranged in a manner that 5 CBGs for TB #2 are used, such that all the 5 bits may be constructed using the AND or OR operation between HARQ-ACK information of TB #1 and HARQ-ACK information of TB #2.

The aforementioned method may also be equally applied to the case in which different numbers of CBGs are used to construct the respective TBs during bundling of TBs on multiple slots and/or CCs.

In addition, if the above-mentioned method is combined with the aforementioned 1-2 to 1-4 HARQ ACK transmission methods, the DAI (or C-DAI or T-DAI) value may include CBG information. In this case, when several TBs are transmitted in MIMO, information about a maximum number of CBGs from among several TBs or information about the sum of CBG numbers transmitted through several TBs may be applied to the corresponding CBG information.

3.2.3. 2-3 Method

If DL data or UL data scheduled through DCI is composed of 2 TBs (or more), specific TB(s) may be initially Tx-scheduled TB(s), and other TB(s) may be retransmission-scheduled TB(s).

If it is assumed that resource allocation considering DCI overhead is TB-commonly applied irrespective of scheduling of several TBs, the corresponding resource allocation interpretation method and/or TB transmission method may be changed.

For example, during TB retransmission, retransmission only to some CBGs may be implemented using a much smaller number of resources than the number of resources for TB initial transmission. In this case, the resource allocation method may be decided on the basis of TB where CBG retransmission is performed. In more detail, in the case of CBG retransmission, the DCI field is re-interpreted by the prescribed rule, and a much smaller number of REs than the number of REs needed for TB initial transmission can be allocated as resources capable of being transmitted. In this case, the initial transmission TBs to be simultaneously transmitted may be transmitted with a considerably high coding rate using only the corresponding resources.

In another example, in order to increase efficiency of initial TB transmission, the resource allocation method may be decided on the basis of TB where initial transmission is performed. In this case, the TBs where retransmission is performed may be transmitted at a very low coding rate. In the case of CBG retransmission, although the method for re-interpreting the DCI field is introduced by the prescribed rule, if initial transmission of some TBs is present, re-interpretation of the resource assignment on DCI may be excluded.

3.2.4. 2-4 Method

If CBG (re)transmission is established in DL data or UL data, DCI needed for scheduling DL data or UL data may schedule (re)transmission of some CBGs from among TBs, and may signal which CBG is actually transmitted.

For example, when DL data or UL data is scheduled for the UE having information indicating that a maximum of 5 CBGs can be constructed for only one CW (or TB), the eNB (or BS) may signal indexes (e.g., through 5-bit bitmap) of the actually transmitted CBGs from among 5 CBGs through a specific field on DCI.

In this case, a specific field indicating CBGs that are actually transmitted in the DCI will hereinafter be referred to as a CBG transmission indicator (CBGTI). If 2-CW (or 2-TB) transmission of DL data or UL data is established, CBGTIs may be established on the scheduling DCI while being classified according to individual CWs (or TBs).

In order to increase reliability of UCI information in consideration of UE coverage states or the like, HARQ-ACK bundling may be established. For example, spatial domain bundling (or codeword bundling) may be established.

In this case, although 2-CW (or 2-TB) transmission of DL data or DL data is established, CBGTI may not be established on the scheduling DCI for each CW (or for each TB), and only one CBGTI may be established. In this case, all CBG indexes indicated by one CBGTI can be applied to 2 CWs (or 2 TBs).

For example, it is assumed that information indicating that a maximum of 5 CBGs can be constructed in one CW (or TB) is established in a specific UE, and it is also assumed that information about 2-CW (or 2-TB) transmission of DL data and spatial domain bundling (or codeword bundling) is established in the specific UE.

In this case, the UE having received DL data initial transmission of 2 CWs (or 2 TBs) may perform spatial domain bundling (i.e., a logical AND operation between HARQ-ACK information segments of the same CBG indexes), such that the UE may feed back HARQ-ACK information corresponding to '01100' (where 0=NACK, and 1=ACK). Only one CBGTI on the DL data scheduling DCI indicating the corresponding retransmission may be established. In this case, the CBGTI may be composed of bitmap information of '01100'. The UE having received the above-mentioned information may recognize that DL data corresponding to the second CBG and DL data corresponding to the third CBG have been transmitted to all of 2 CWs (or 2 TBs).

Figure 17:
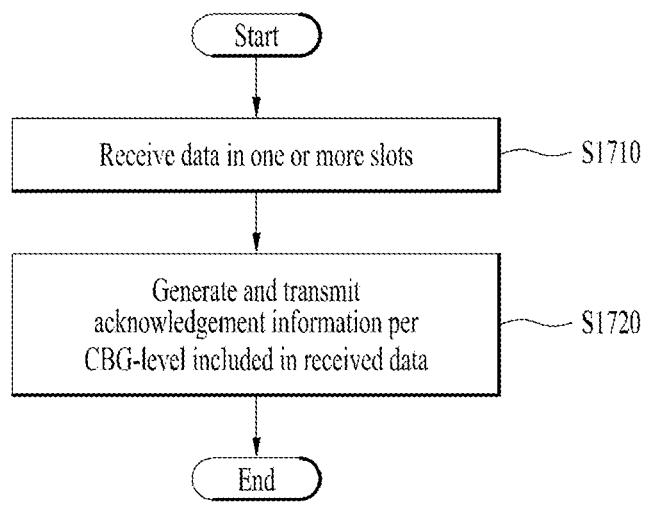
FIG. 17 is a flowchart illustrating a method for transmitting acknowledgement information of a user equipment (UE) according to an embodiment of the present disclosure.

FIG. 17 is a flowchart illustrating a method for transmitting acknowledgement information of a user equipment (UE) according to an embodiment of the present disclosure.

Referring to FIG. 17, the UE may receive data through one or more slots (S1710). For example, as shown in FIGS. 13 to 16, the UE may receive data in slots slot #T, slot #T+1, and slot #T+3.

Subsequently, the UE may generate acknowledgement information for each CBG (i.e., CBG-level) contained in data received in the at least one slot, as acknowledgement response information to be transmitted in the first slot (e.g., slot #T+9), and may transmit the generated acknowledgement information in the first slot (e.g., slot #T+9) (S1720).

In this case, as shown in FIGS. 13 to 16, the acknowledgement information transmitted in the first slot may be constructed in various ways.

Referring to FIG. 13, the acknowledgement information may be constructed to have a first bit size (e.g., N×M) that is decided on the basis of not only a maximum number N of slots interacting with the acknowledgement information Tx time point in the first slot, but also a maximum number M of CBGs for a single slot.

In this case, the acknowledgement information composed of (N×M) bits may be composed of bit information about M CBGs for each of the N slots. Thus, if data is not scheduled or is not received in a specific slot from among the N slots, all information about M bits of the specific slot may be set to NACK (Non-Acknowledgement). In addition, if data is received in a specific slot from among the N slots and the number of received CBGs is less than M, all information of bits having no corresponding CBGs from among information of M bits about the specific slot may be set to NACK.

In more detail, as can be seen from FIG. 13, since data received in the slot slot #T+2 is not present (or since data scheduled by the eNB is not present), all information of 4 bits corresponding to the slot slot #T+2 may be set to NACK.

In addition, data received in the slot slot #T+1 is composed of 3 CBGs, such that the remaining one bit information may be set to NACK.

In this case, N may be set to 4 as shown in FIG. 13. However, the above-mentioned example is merely an example, and the N value may also be changed by eNB setting information or the like.

As shown in the example of FIG. 14, the acknowledgement information may be constructed to have the second bit size (e.g., K×M) that is determined on the basis of not only the number K of slots established for acknowledgement information in the first slot, but also the maximum number M of CBGs for only one slot.

In this case, the acknowledgement information composed of (K×M) bits may be composed of information of bits about M CBGs for each of the K slots. In this case, based on a downlink assignment index (DAI) value received in the at least one slot, if data is not scheduled or is not received at a specific slot from among the K slots, all M-bit information of slots of the specific slot may be set to NACK. If data is received in the specific slot from among the K slots and the number of received CBGs is less than M, all bit information having no corresponding CBGs from among the M-bit information of the specific slot may be set to NACK.

In this case, each DAI received in the at least one slot may indicate the number of scheduled slots about acknowledgement information in the first slot until reaching the corresponding slot in the time domain.

In more detail, although the example of FIG. 14 assumes that data is normally received in the slot slot #T+1 for convenience of description, the UE may not receive information indicating DAI=2 and data corresponding to DAI=2 in the slot slot #T+1 as necessary. In this case, the UE may receive information indicating DAI=3 in the slot slot #T+3, such that the UE may recognize that data corresponding to DAI=2 was not received.

In addition, data received in the slot slot #T+1 may be composed of 3 CBGs, and the remaining one bit information may be set to NACK.

In this case, K may be set to a value (e.g., 3) less than N.

In the aforementioned structures, M may be UE-specifically established, or may be group-commonly established (where the group includes the UE).

In accordance with the example of FIG. 15, the acknowledgement information may be constructed to have a third bit size (e.g., X) that is determined based on a total number X of CBGs transmitted in the at least one slot.

In this case, X may be determined based on all T-DAIS (Total Downlink Assignment Indexes) received in the at least one slot. Based on each of the count DAI (C-DAI) values received in the at least one slot, bit information through which no corresponding CBGs from among the acknowledgement information composed of X bits are received may be set to NACK.

In accordance with the example of FIG. 16, the acknowledgement information may be constructed to have a fourth bit size (e.g., K×Y) that is determined on the basis of not only the number K of slots established for the acknowledgement information at the first slot, but also the maximum number Y of CBGs transmitted at one slot from among the at least one slot.

In this case, based on a downlink assignment index (DAI) value received from the last slot from among the at least one slot, bit information having no corresponding CBGs from among the acknowledgement information composed of (K×Y) bits may be set to NACK.

Since each embodiment of the above-described proposed method can be considered as one method for implementing the present disclosure, it is apparent that each embodiment can be regarded as a proposed method. In addition, the present disclosure can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

4. Device Configuration

Figure 18:
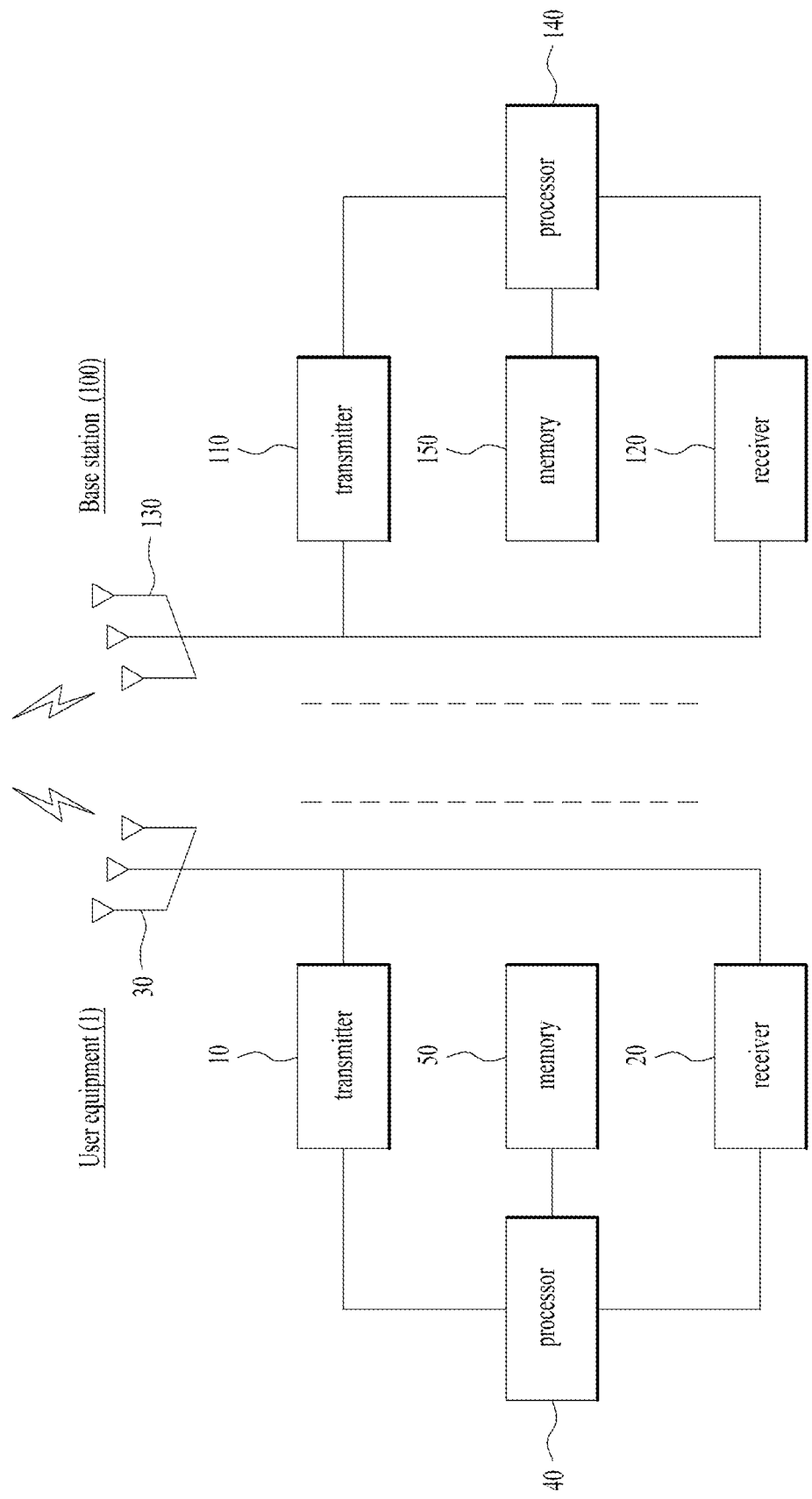
FIG. 18 is a diagram illustrating a configuration of a user equipment (UE) and a base station (BS) in which the proposed embodiments may be implemented.

FIG. 18 is a diagram illustrating configurations of a UE and a base station capable of being implemented by the embodiments proposed in the present disclosure. The UE and the eNB (or BS) shown in FIG. 18 operate to implement the embodiments of the method for transmitting and receiving acknowledgement information between the UE and the eNB (or BS).

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 may receive data from at least one slot through the receiver 20. Subsequently, the UE 1 may generate CBG-level acknowledgement information contained in data received in the at least one slot, as acknowledgement information to be transmitted at the first slot through the processor 40. Subsequently, the UE 1 may transmit acknowledgement information generated at the first slot through the transmitter 10.

In this case, the acknowledgement information may be constructed to have the following various bit sizes as necessary.

First Bit Size—The first bit size is determined on the basis of not only the maximum number N of slots interacting with the acknowledgement information Tx time point at the first slot, but also the maximum number M of CBGs for one slot.

Second Bit Size—The second bit size is determined on the basis of the number K of slots established for acknowledgement information at the first slot, but also the maximum number M of CBGs for one slot.

Third Bit Size—The third bit size is determined on the basis of a total number X of CBGs transmitted in the at least one slot.

Fourth Bit Size—The fourth bit size is determined on the basis of not only the number K of slots established for the acknowledgement information at the first slot, but also the maximum number Y of CBGs transmitted in one slot from among the at least one slot.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method for transmitting hybrid automatic repeat request-acknowledgement (HARQ-ACK) information by a wireless communication device, the method comprising:
performing a data reception for 2 transport blocks (TBs) each including at least one code block group (CBG);
determining, based on a result of the data reception, first CBG-based HARQ-ACK information related to a first TB and second CBG-based HARQ-ACK information related to a second TB; and
transmitting, in response to the data reception, a HARQ-ACK response including the first CBG-based HARQ-ACK information and the second CBG-based HARQ-ACK information,
wherein the first CBG-based HARQ-ACK information for the first TB and the second CBG-based HARQ-ACK information for second TB are generated to have a same payload size.

2. The method according to claim 1, further comprising:
receiving information regarding a maximum number of CBGs.

3. The method according to claim 2, wherein the information regarding the maximum number of CBGs indicates a maximum number of CBGs can be configured in a single TB.

4. The method according to claim 1, wherein the same payload size for the first CBG-based HARQ-ACK information and the second CBG-based HARQ-ACK information is determined based on a maximum number of CBGs.

5. The method according to claim 1, wherein each of the first CBG-based HARQ-ACK information and the second CBG-based HARQ-ACK information has a capacity suitable for a maximum number of CBGs.

6. The method according to claim 1, wherein the first CBG-based HARQ-ACK information for the first TB and the second CBG-based HARQ-ACK information have the same payload size, even in a case where different number of CBGs are allocated to the first TB and the second TB respectively.

7. The method according to claim 1, wherein the same payload size is determined independently from an actual number of CBGs of each TB.

8. The method according to claim 7, wherein, in a case where the actual number of CBGs 'M' is smaller than a maximum number of CBGs 'N', remaining 'N-M' bits in corresponding CBG-based HARQ-ACK information for a corresponding TB are set to negative acknowledgement (NACK) values.

9. The method according to claim 1, wherein a size of the HARQ-ACK response is determined based on a total number of data receptions associated with a same HARQ-ACK transmission time including the data reception performed for the first TB and the second TB.

10. The method according to claim 1, wherein the wireless communication device is configured to support carrier aggregation, and a size of the HARQ-ACK response is determined based on a number of carriers configured in the wireless communication device.

11. The method according to claim 1,
wherein the wireless communication device is a user equipment (UE) configured to operate in a 3rd generation partnership project (3GPP)-based wireless communication system,
wherein the data reception is performed through a physical downlink shared channel (PDSCH), and
wherein the HARQ-ACK response is transmitted through a physical uplink control channel (PUC CH).

12. The method according to claim 1, further comprising:
receiving, through a physical downlink control channel (PDCCH), downlink control information (DCI) for scheduling the 2 TBs.

13. A device for processing a signal for wireless communication, the device comprising:
a memory for storing one or more instructions; and
at least one processor for executing the one or more instructions,
wherein the at least one processor is configured to perform a data reception for 2 transport blocks (TBs) each including at least one code block group (CBG), to determine, based on a result of the data reception, first CBG-based hybrid automatic repeat request-acknowledgement (HARQ-ACK) information related to a first TB and second CBG-based HARQ-ACK information related to a second TB and to generate, in response to the data reception, a HARQ-ACK response including the first CBG-based HARQ-ACK information and the second CBG-based HARQ-ACK information, upon the one or more instructions are executed,
wherein the first CBG-based HARQ-ACK information for the first TB and the second CBG-based HARQ-ACK information for second TB are generated to have a same payload size, and
wherein the same payload size for the first CBG-based HARQ-ACK information and the second CBG-based HARQ-ACK information is determined based on information regarding a maximum number of CBGs.

14. The device according to claim 13, wherein the device is an application specific integrated circuit (ASIC) or a digital signal processing device.

15. A wireless communication device comprising:
a transmitter;
a receiver; and
at least one processor controls the transmitter and the receiver,
wherein the at least one processor is configured to perform, via the receiver, a data reception for 2 transport blocks (TBs) each including at least one code block group (CBG), to determine, based on a result of the data reception, first CBG-based hybrid automatic repeat request-acknowledgement (HARQ-ACK) information related to a first TB and second CBG-based HARQ-ACK information related to a second TB and to transmit, in response to the data reception, a HARQ-ACK response including the first CBG-based HARQ-ACK information and the second CBG-based HARQ-ACK information, via the transmitter, wherein the first CBG-based HARQ-ACK information for the first TB and the second CBG-based HARQ-ACK information for second TB are generated to have a same payload size, and wherein the same payload size for the first CBG-based HARQ-ACK information and the second CBG-based HARQ-ACK information is determined based on information regarding a maximum number of CBGs.

16. A method for receiving hybrid automatic repeat request-acknowledgement (HARQ-ACK) information by a wireless communication device, the method comprising:

performing a data transmission for 2 transport blocks (TBs) each including at least one code block group (CBG); and receiving, in response to the data transmission, a HARQ-ACK response including first CBG-based HARQ-ACK information related to a first TB and second CBG-based HARQ-ACK information related to a second TB, wherein the first CBG-based HARQ-ACK information for the first TB and the second CBG-based HARQ-ACK information for second TB have a same payload size, and wherein the same payload size for the first CBG-based HARQ-ACK information and the second CBG-based HARQ-ACK information is determined based on information regarding a maximum number of CBGs.

17. The method according to claim 16, wherein the wireless communication device is a base station configured to operate in a 3rd generation partnership project (3GPP)-based wireless communication system, wherein the data transmission is performed through a physical downlink shared channel (PDCCH), and wherein the HARQ-ACK response is received through a physical uplink control channel (PUCCH).

18. A wireless communication device comprising:
a transmitter;
a receiver; and
at least one processor controls the transmitter and the receiver, wherein the at least one processor is configured to perform, via the transmitter, a data transmission for 2 transport blocks (TBs) each including at least one code block group (CBG); and to receive, in response to the data transmission, a hybrid automatic repeat request-acknowledgement (HARQ-ACK) response including first CBG-based HARQ-ACK information related to a first TB and second CBG-based HARQ-ACK information related to a second TB, via the receiver, wherein the first CBG-based HARQ-ACK information for the first TB and the second CBG-based HARQ-ACK information for second TB have a same payload size, and wherein the same payload size for the first CBG-based HARQ-ACK information and the second CBG-based HARQ-ACK information is determined based on information regarding a maximum number of CBGs.

19. A non-transitory processor readable medium recorded thereon one or more instructions that, when executed by at least one processor, perform operations comprising:

performing a data reception for 2 transport blocks (TBs) each including at least one code block group (CBG);

determining, based on a result of the data reception, first CBG-based HARQ-ACK information related to a first TB and second CBG-based HARQ-ACK information related to a second TB; and transmitting, in response to the data reception, a HARQ-ACK response including the first CBG-based HARQ-ACK information and the second CBG-based HARQ-ACK information, wherein the first CBG-based HARQ-ACK information for the first TB and the second CBG-based HARQ-ACK information for second TB are generated to have a same payload size.

* * * * *